United States Patent [11] 3,609,092

| [72] | Inventors | Keith J. Smith<br>Lockport;<br>Harold S. Eldridge, Kenmore, both of N.Y. |
|---|---|---|
| [21] | Appl. No. | 693,066 |
| [22] | Filed | Dec. 26, 1967 |
| [45] | Patented | Sept. 28, 1971 |
| [73] | Assignee | Hooker Chemical Corporation<br>Niagara Falls, N.Y. |

[54] ALKALI METAL PHOSPHATE COMPOSITION AND PROCESS FOR PRODUCING SAME
9 Claims, No Drawings

[52] U.S. Cl................................................. 252/175,
21/2.7, 23/106, 134/2, 134/42, 252/80
[51] Int. Cl..................................................... C01b 25/30,
C02b 5/04, C23f 14/02
[50] Field of Search......................................... 252/175,
80, 182, 397; 23/106, 107; 134/2, 22, 42; 21/2.7;
71/34, 36

[56] References Cited
UNITED STATES PATENTS

| 2,358,222 | 9/1944 | Fink et al. | 252/175 X |
|---|---|---|---|
| 2,358,965 | 9/1944 | Durgin et al. | 252/175 X |
| 2,370,472 | 2/1945 | King | 252/175 X |
| 2,494,828 | 1/1950 | Munter | 252/175 |
| 2,511,249 | 6/1950 | Durgin et al. | 252/175 X |
| 2,569,936 | 10/1951 | Liddell | 252/175 |

*Primary Examiner*—John T. Goolkasian
*Assistant Examiner*—M. E. McCamish
*Attorneys*—Peter F. Casella, Richard P. Mueller, Donald C. Studley and James F. Mudd

ABSTRACT: An incompletely molecularly dehydrated alkali metal polyphosphate composition prepared by heating an alkali metal phosphate mixture having a ratio of alkali metal oxide to $P_2O_5$ within the range of about 1.15 to 1.40:1 and an $Na_2O$ to $K_2O$ ratio which is not substantially in excess of about 6:1, the heating of the mixture being carried out at a temperature within the range of about 100° C. to 500° C., at atmospheric pressure, for a period sufficient to obtain a product having an ignition loss which is not substantially greater than about 5% by weight of the product. The resulting polyphosphate composition has good water solubility and sequestering action.

ALKALI METAL PHOSPHATE COMPOSITION AND PROCESS FOR PRODUCING SAME

The present invention relates to an improved alkali metal polyphosphate composition and to its method of preparation and, more particularly it relates to the preparation of an improved alkali metal polyphosphate composition which has good solubility and sequestering properties and is useful in water-treating processes.

Heretofore, numerous alkali metal polyphosphate materials have been utilized for their sequestering value in various water-treating processes. Typically, the alkali metal polyphosphates used have been glassy phosphates, such as sodium hexametaphosphate and the like. These materials have been used in water conditioning, for sequestering calcium and other similar ions, as well as other water treatments, including their use in various cleaning compositions which take advantage of their building and/or sequestering action. For such uses, it is desirable that the phosphate material have an appreciable water solubility, and good sequestering action, and in some instances it is further desirable that they are not extremely alkaline, pH's not substantially in excess of about 8 to 9 being preferred. Although the various phosphate glass compositions, including hexametaphosphate, have generally been found to satisfactorily fulfill these requirements, such materials generally necessitate the use of relatively high temperatures, e.g. 800 to 1,000° C., in their preparation. This, of course, adds to the cost of such materials, making them undesirably expensive for many of these uses.

It is, therefore, an object of this invention to provide an improved alkali metal polyphosphate composition which has good solubility and sequestering properties.

A further object of the present invention is to provide an improved alkali metal polyphosphate material which can be produced appreciably more cheaply than common glassy phosphates, such as sodium hexametaphosphates.

Another object of the present invention is to provide an improved process for producing an alkali metal polyphosphate composition which has good solubility and sequestering properties.

These and other objects will become apparent to those skilled in the art from the description of the invention which follows.

Pursuant to the above objects, the present invention includes an incompletely molecularly dehydrated alkali metal polyphosphate composition prepared by heating an alkali metal phosphate mixture having a ratio of alkali metal oxide to $P_2O_5$ within the range of about 1.15 to 1.40 and an $Na_2O$ to $K_2O$ ratio which is not substantially in excess of about 6:1, the heating of the alkali metal phosphate mixture being carried out at a temperature within the range of about 100 to 500° C., at atmospheric pressure, for a period sufficient to obtain a product having an ignition loss which is not substantially greater than about 5 percent by weight of the product. The resulting product, as produced by this method, is found to have good water solubility and sequestering properties, while having a neutral to only moderately alkaline pH. It is to be appreciated that in referring to the percent ignition loss, it is intended to refer to the percent loss in weight of the product when it is heated for one hour at 600° C.

More specifically, in the practice of the present invention, there is formed an alkali metal phosphate mixture. This mixture may be formed in any convenient manner which will result in the desired alkali metal oxide to $P_2O_5$ ratio. Thus, for example, one or more alkali metal phosphates, as such, may be admixed to form the alkali metal phosphate mixture having the desired ratio. Preferably, however, the alkali metal phosphates are formed in situ in the mixture by reacting suitable alkali metal compounds, such as alkali metal hydroxides, alkali metal carbonates, or the like, with phosphoric acid, the amounts of these reactants being selected so as to provide desired alkali metal oxide to $P_2O_5$ ratio of 1.15 to 1.40:1 in the reaction mixture.

Generally, it has been found to be preferable that the alkali metal phosphate mixture is formulated in aqueous solution, the resulting alkali metal phosphates being present in amounts within the range of about 5.0 percent up to the saturation point of the solution. In this manner, a more intimate and uniform admixture of the alkali metal phosphates are obtained than is possible when admixing dry phosphate materials. Thereafter, it is generally preferred that the aqueous phosphate mixture be heated at a temperature and for a period sufficient to effect removal of the water of the solution. This heating to remove the water of solution may be carried out as a separate step or it may be accomplished substantially simultaneously with the heating of the phosphate mixture to produce molecular dehydration thereof, as will be described in more detail hereinafter.

In forming the preferred aqueous admixture of the alkali metal phosphates, various mono-, di-, and trialkali metal orthophosphates may be dissolved in water in proportions sufficient to provide the desired alkali metal oxide to $P_2O_5$ ratio within the range of about 1.15 to 1.40:1. Preferably, however, an aqueous mixture of phosphoric acid is formed to which is added alkali metal hydroxides, carbonates, or the like, in amounts sufficient to react with the phosphoric acid in solution, forming the alkali metal phosphates in situ, the amounts of the reactants used being such as to provide the desired alkali metal oxide to $P_2O_5$ ratio in the reaction mixture. As has been noted, the resulting aqueous mixture of the alkali metal phosphate desirably contains these phosphates in amounts within the range of about 5.0 percent up to the saturation point of the solution. It is, however, preferable that the phosphate concentration in the solution be as high as possible, thus minimizing the amount of water which must be removed in the subsequent drying step.

In addition to having an alkali metal oxide to $P_2O_5$ ratio within the range of about 1.15 to 1.40:1, the alkali metal phosphate mixture also desirably has a ratio of $Na_2O$ to $K_2O$ which is not substantially in excess of about 6:1. Preferably, the alkali metal phosphate mixture is a sodium and potassium phosphate material wherein the $Na_2O$ to $K_2O$ ratio is within the range of about 1:1 to about 4:1. In forming such mixtures, the alkali metal compound, such as the carbonates, hydroxides, and the like or the alkali metal phosphates, where these are used, in the aqueous solution will be a mixture of the various sodium and potassium compounds, the relative amounts of each being such as to give the resulting reaction mixture the desired ratio of $Na_2O:K_2O$.

Where the various sodium and potassium compounds, such as the carbonate, hydroxides, or the like, are used to formulate the aqueous alkali metal phosphate mixture, these compounds may be added in any convenient form, including the solid material, as well as aqueous solutions, such as for example a 50 percent aqueous solution of sodium hydroxide or potassium hydroxide. Additionally, where phosphoric acid is added to the aqueous solutions to form the alkali metal phosphates in situ, this may, likewise, be added in any convenient concentration, although, generally, the commercially available 85 percent orthophosphoric acid is preferred, from the standpoint of cost and availability. Where the aqueous alkali metal phosphate mixtures are formed from the alkali metal phosphates themselves, such as the mono-, di-, and trisodium and potassium orthophosphates, these may conveniently be added as solids to the water to form the desired aqueous solutions.

Once the aqueous alkali metal phosphate mixture is formed, having the desired alkali metal oxide to $P_2O_5$ and $Na_2O$ to $K_2O$ ratios, the aqueous solution may be heated to remove the water of solution and from a substantially dry mixture. Where this is done as a separate step, the heating is desirably carried out at temperatures within the range of about 100 to 175° C., with times up to about 24 hours being typical. Thereafter, the alkali metal phosphate mixture is then heated at a temperature within the range of about 100 to 500° C. for a period sufficient to obtain a product having an ignition loss which is not substantially greater than about 5 percent by weight of the product. As has been noted hereinabove, the heating of the aqueous mixture to remove the water of solution may, if desired, be carried out simultaneously with the heating of the alkali metal phosphate mixture to obtain the desired amount of ignition loss, i.e., the desired molecular dehydration.

As will be appreciated by those in the art, the amount of heating necessary will depend upon the temperature used and the amount of molecular dehydration which is desired. Generally, from the standpoint of reducing the time necessary to carry out the heating process, thus improving the process economics, it is preferred to carry out the heating at the higher temperatures in the range, e.g., temperatures of about 400 to 500° C. When using such higher temperature heating times of from about 1 to 2 hours are typical in order to obtain the desired degree of molecular dehydration and form the desired alkali metal polyphosphate composition. It is to be appreciated, however, that the lower heating temperatures may also be used, although, of course, with such temperatures correspondingly longer heating times will be necessary. It is further to be appreciated that where reference is made to heating the alkali metal phosphates mixture at temperatures within the range of 100 to 500° C., it is considered that these are the temperatures which will be utilized when the process is carried out under substantially atmospheric pressure. It is, of course, possible to carry out the heating step at either sub- or superatmospheric pressures and where this is done, the usable temperature range will change, so as to correspond to the 100 to 500° C. range used at atmospheric pressure.

The heating of the alkali metal phosphate mixture to obtain a product having an ignition loss which is not substantially greater than about 5 percent weight of the product may be carried out in any convenient manner. For example, the heating may be carried out in a batch process, in a suitable furnace or heating pot. In such a process, it is generally preferable that the water of solution is removed from the alkali metal phosphate mixture prior to the time it is heated to effect the desired molecular dehydration. In this process, however, the water of solution may be removed simultaneously during the molecular dehydration heating step. Alternatively, the heating to effect molecular dehydration of the alkali metal phosphate mixture may be carried out in a suitable kiln or calciner, wherein the aqueous alkali metal phosphate mixture is sprayed into the calciner, preferably onto a bed of preformed particles of the alkali metal polyphosphate product. In such operation, the removal of the water of solution is desirably carried out simultaneously with the molecular dehydration heating portion of the process. It is believed that those in the art will readily be able to determine other suitable heating methods which may be used to carry out the desired degree of molecular dehydration and form the present alkali metal polyphosphate product.

After the alkali metal phosphate mixture has been heated to obtain a product having an ignition loss which is not substantially greater than about 5 percent by weight of the product, the resulting alkali metal polyphosphate product is recovered. In carrying out the heating of the alkali phosphate mixture to obtain this product, it has been found to be desirable that the heating is not carried out to the extent that complete molecular dehydration of the mixture, or a product having no ignition loss is obtained. It has been found to be desirable that the alkali metal polyphosphate product obtained is one which is not completely molecularly dehydrated and although the exact degree of incomplete molecular dehydration is not believed to be critical, it is believed to be desirable that the alkali metal polyphosphate product obtained has an ignition loss of at least about 0.1 percent.

With regard to the recovery of the incompletely molecularly dehydrated alkali metal polyphosphate product, it has been found that the physical form of this product, after heating, but before cooling to room temperature, will depend, to a great extent, upon the ratio of alkali metal oxide to $P_2O_5$ in the initial alkali metal phosphate reaction mixture. In general, it has been found that where the higher ratios, e.g., alkali metal oxide to $P_2O_5$ ratios of from about 1.35 to 1.40:1 are used, a solid product is obtained even at heating temperatures of from 400 to 500° C. Where the lower ratios are used, however, the product melts at the higher heating temperatures and, hence, is not obtained as a solid. In such instances, of course, the liquid product may be subjected to a quick cooling operation to obtain a solid material which may then be broken up into a solid product of appropriate particle size.

The exact composition of the incompletely molecularly dehydrated alkali metal polyphosphate products of the present invention are not known for certain although, it is believed, that these products are mixtures of various phosphate materials, including tripolyphosphates, metaphosphates, pyrophosphates, orthophosphates and the like. Additionally, there is some evidence that the relative amounts of these components differ significantly from those which are obtained when similar alkali metal phosphate mixtures are molecularly dehydrated by heating to higher temperatures such as 800 to 1,000° C., as in the production of normal glassy phosphate materials. In any event, it has been found that the solubility, and sequestering properties and the pH of the products of the present invention are comparable to those of polyphosphate materials produced by heating to the higher, less economical temperatures of 800 to 1,000° C.

In this regard, it has been found that for the compositions, in general, to be suitable for use in water treatment, both as sequestering agents and as builders or the like in detergent compositions, the compositions should have a solubility of at least about 30 percent at 23° C., an oxalate sequestering value of at least about 15 grams, and a pH within the range of about 6.5 to 9. In carrying out the tests for these properties, the following test procedures are used:

OXALATE SEQUESTERING VALUE TEST

A 0.400-gram sample of the test composition is dissolved in 100 milliliters of distilled water. Five milliliters of a 5 percent aqueous ammonium oxalate solution is added and the solution is warmed to 55–60° C. The solution is then titrated with a 0.1 molar aqueous solution of calcium chloride until the first appearance of turbidity. The results are reported as grams of $CaCO_3$ sequestered per 100 grams of sample. These results are obtained by multiplying the number of milliliters of the $CaCl_2$ solution used by 2.5.

SOLUBILITY TEST

Place 10-gram distilled water in a 30–50 ml. microflask fitted with a magnetic stirring bar, thermometer, closure, water bath, clamp and thermostir. Increments of sample from a preweighed vial thereof are added at 23° C. until undissolved solids can be visually detected over a 15 min. period.

The contents of the flask are checked for undissolved solids by filtering through a preweighed filter paper, weighing the latter after filtration and drying in an oven. Any increase in weight is of course subtracted from the weight loss of the vial.

pH TEST

Dissolve 0.4–0.6 gram of sample in distilled water to 100 gram total weight. This solution is placed around pH meter electrodes and the pH read off directly from the dial.

The incompletely molecular dehydrated alkali metal polyphosphate composition of the present invention have been found to process the sequestering and solubility properties and have a pH within the ranges which have been indicated hereinabove as being suitable for compositions used in water-treating processes. Thus, these compositions are useful for their sequestering action in water treatment to remove calcium and other ions, and, additionally, are useful as builders or extenders in detergent formulations, particularly liquid detergent compositions.

In order that those skilled in the art may better understand the present invention and the manner in which it may be practiced, the following specific examples are given. In these examples, unless otherwise indicated, parts and percents are by weight and temperatures are in degrees centigrade. It is to be appreciated, however, that these examples are merely exemplary of the present invention and the manner in which it may be practiced and are not to be taken as a limitation thereof.

In examples 1 through 6 85 percent phosphoric acid was diluted with 200 grams of distilled water and the requisite amounts of sodium carbonate and potassium carbonate added thereto while stirring. The specific amounts of the components were varied in each instance, to give the indicated $Na_2O$, $K_2O$ and $P_2O_5$ ratios, The resulting aqueous mixtures were then heated for about 18 hours at 150° C. in a circulating air oven, to remove substantially all of the water of solution. Thereafter, the phosphate mixture was heated in a muffle furnace for the time and temperatures indicated in the examples. The resulting products were then cooled, crushed and milled to provide a material substantially all of which would pass through a 20-mesh screen. The products were then tested for solubility, pH and sequestering value using the procedures which have been set forth hereinabove. Using this procedure the following results were obtained:

| Example | $Na_2O+K_2O$: $P_2O_5$ | $Na_2O$: $K_2O$ | Percent solubility at 23° C. | Sequestration in grams | pH | Heating time (minutes) | Heating temperature (° C.) | Physical form of product |
|---|---|---|---|---|---|---|---|---|
| 1 | 1.15 | 3.02 | 64 | 17 | 6.8 | 120 | 500 | Glass. |
| 2 | 1.25 | 3.03 | 57 | 18 | 7.0 | 120 | 500 | Do. |
| 3 | 1.30 | 3.21 |  | 15 |  | 60 | 500 | Do. |
| 4 | 1.35 | 3.05 | 57 | 15 | 8.0 | 120 | 500 | Solid. |
| 5 | 1.40 | 3.37 | 43 | 17 | 7.5 | 60 | 400 | Do. |
| 6 | 1.40 | 3.37 | 33 | 19 | 8.5 | 60 | 500 | Do. |

EXAMPLE 7

The procedure of the preceding examples 1 through 6 was repeated with the exception that the initial alkali metal phosphate reaction mixture was prepared by combining 72.26 grams of 50 percent hydroxide, 29.78 grams of 50 percent potassium hydroxide and 96.61 grams of 85 percent ortho phosphoric acid. This composition had an $Na_2O$ plus $K_2O$ to $P_2O_5$ ratio of 1.40 and a $Na_2O$ to $K_2O$ ratio of about 3.0 The aqueous admixture was dried on a hot plate and was then calcined at 400° C. for 1 hour. The resulting product which gave an ignition loss of 1.27 percent, had a solubility between 35 and 40 percent, a sequestration value of 18.57 grams $CaCO_3$ and a pH of 7.8.

EXAMPLE 8

The procedure of example 7 was repeated with the exception that the material was calcined for 1 hour at 500° C. The resulting product which gave an ignition loss of 0.35 percent had a solubility of from 34 to 36 percent, a sequestration value of 26.25 grams and a pH of 8.6.

While there have described various embodiments of the invention, the compositions and methods described are not intended to be understood as limiting the scope of the invention as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An incompletely molecularly dehydrated alkali metal polyphosphate composition formed by the method which comprises forming an aqueous alkali metal phosphate mixture having the ratio of alkali metal oxide to $P_2O_5$ within the range of about 1.15 to 1.40:1 and an $Na_2O$ to $K_2O$ ratio which is not substantially in excess of about 6:1, heating the thus-formed aqueous mixture at a temperature and for a time sufficient to substantially remove the water of solution, thereafter, heating the mixture at a temperature within the range of about 100 to 500° C. for a period sufficient to effect an incomplete molecular dehydration thereof and obtain a product having an ignition loss which is within the range of about 0.1 to 5.0 percent by weight of the product and recovering the thus-formed alkali metal polyphosphate composition.

2. The composition as claimed in claim 1 wherein the ratio of $Na_2O$ to $K_2O$ in the alkali metal phosphate mixture is within the range of about 1:1 to 4:1.

3. The composition as claimed in claim 2 wherein the heating of the mixture to remove the water of solution and to effect the incomplete molecular dehydration is carried out in a single step.

4. The composition as claimed in claim 2 wherein the heating to effect the removal of the water of solution is carried out at a temperature within the range of about 100 to 175° C. and the heating to effect the incomplete molecular dehydration is carried out as a separate step at a temperature within the range of about 400 to 500° C.

5. A process for forming an incompletely molecularly dehydrated alkali metal polyphosphate composition which comprises forming an aqueous alkali metal phosphate mixture having a ratio of alkali metal oxide to $P_2O_5$ within the range of about 1.15 to 1.40:1 and an $Na_2O$ to $K_2O$ ratio which is not substantially in excess of about 6:1, heating the thus-formed aqueous alkali metal phosphate mixture at a temperature and for a period sufficient to effect substantially complete removal of the water of solution, thereafter, heating the mixture at a temperature within the range of about 100 to 500° C. for a period sufficient to effect the incomplete molecular dehydration thereof and obtain a product having an ignition loss which is within the range of about 0.1 to 5.0 percent by weight of the product, and thereafter, recovering the thus-formed alkali metal polyphosphate composition.

6. The method as claimed in claim 5 wherein the ratio of $Na_2O$ to $K_2O$ in the alkali metal phosphate mixture is within the range of about 1:1 to 4:1.

7. The method as claimed in claim 6 wherein the aqueous alkali metal phosphate mixture is formed by reacting an aqueous phosphoric acid solution with an alkali metal compound selected from the group consisting of alkali metal carbonates and alkali metal hydroxides.

8. The method as claimed in claim 6 wherein the heating of the aqueous alkali metal polyphosphate mixture to remove the water of solution and the heating to effect the incomplete molecular dehydration are carried out in a single step.

9. The method as claimed in claim 6 wherein the heating of the aqueous alkali metal phosphate mixture to effect the removal of the water of solution is carried out at a temperature within the range of about 100 to 175° C. and the heating to effect the incomplete molecular dehydration is carried out, as a separate step, at a temperature within the range of about 400 to 500° C.

PO-1050
(5/69)

UNITED STATES PATENT OFFICE
CERTIFICATE OF CORRECTION

Patent No. 3,609,092    Dated 9/28/71

Inventor(s) Keith J. Smith et al

It is certified that error appears in the above-identified patent and that said Letters Patent are hereby corrected as shown below:

Column 5, line 37 "50% hydroxide" should be ---50% sodium hydroxide; line 44 "18.57" should be ---18.75---.

Signed and sealed this 18th day of April 1972.

(SEAL)
Attest:

EDWARD M. FLETCHER, JR.
Attesting Officer

ROBERT GOTTSCHALK
Commissioner of Patents